Aug. 10, 1948.   H. J. OTIS ET AL   2,446,782
MANUFACTURE OF CEMENTITIOUS SHEETS
Filed Jan. 26, 1946
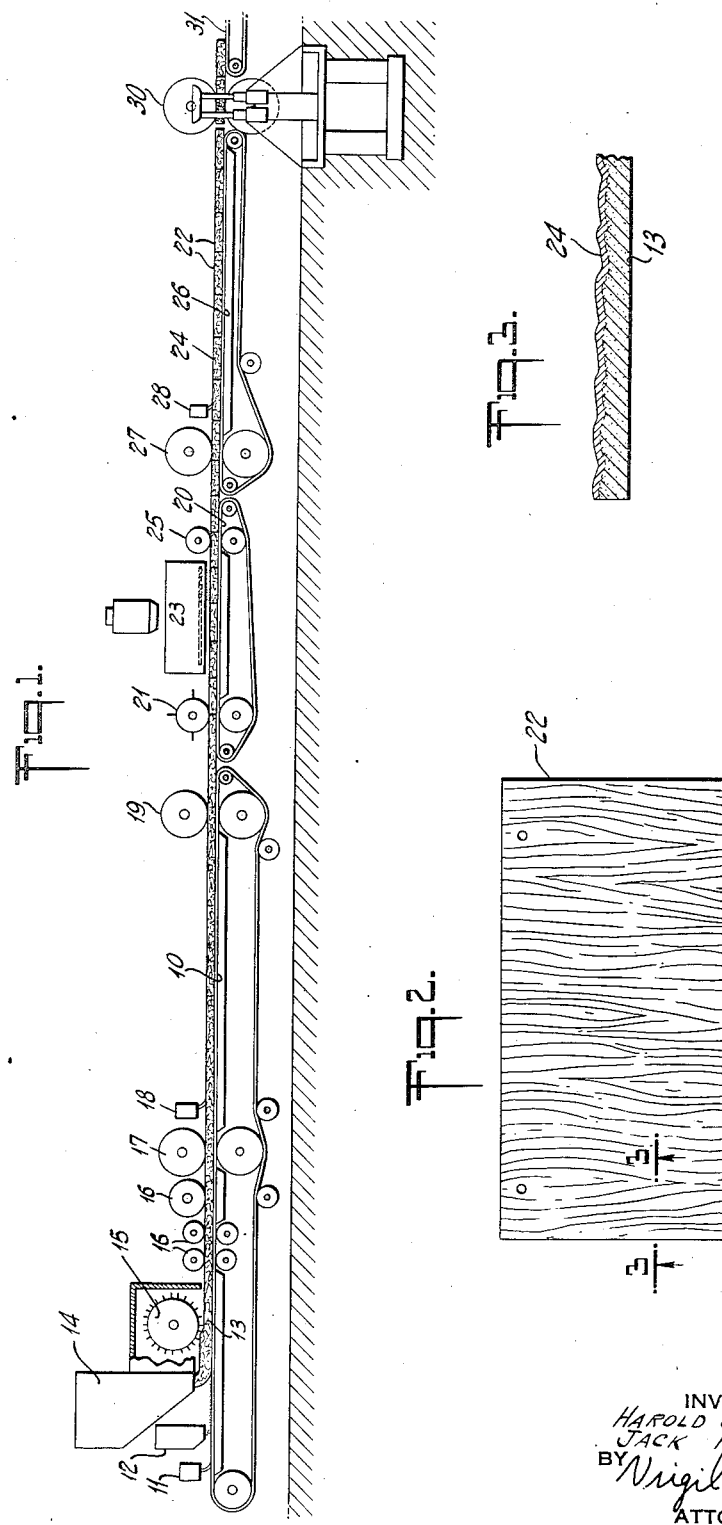
INVENTORS
HAROLD J. OTIS.
JACK HESSE.
BY Virgil O. Kline
ATTORNEY Patented Aug. 10, 1948

2,446,782

UNITED STATES PATENT OFFICE 2,446,782

MANUFACTURE OF CEMENTITIOUS SHEETS

Harold J. Otis, New Orleans, and Jack Hesse, Gretna, La., assignors to Johns-Manville Corporation, New York, N. Y., a corporation of New York Application January 26, 1946, Serial No. 643,798

5 Claims. (Cl. 18—60)

This invention relates to the manufacture of hard and dense fibro-cementitious sheets, and is particularly concerned with an improved method of developing a tough decorative smoothly textured veneer coating for asbestos-cement shingles and siding units.

One method heretofore employed for imparting a decorative finish to the weather-exposed surface of an asbestos-cement shingle or siding unit has involved the steps of forming a thin coating including clean short asbestos fibers, finely divided mineral pigment and hydraulic cement binder, on the top surface of a moist compressible asbestos-cement base sheet, sprinkling coarse granular material as a parting layer over the surface of the thus applied veneer coating, strongly compressing the composite uncured sheet so formed and simultaneously embossing a pattern on the veneer surface, and finally trimming the composite sheet and curing it to develop a hardening set of the cement binder.

Use of coarse sand, slate particles or other coarse granular material as a parting and surfacing medium performs the desirable function of preventing blistering of the veneer surface caused by sticking of the moist veneer to the embossing plates or grain rolls. The granular parting agent also prevents the development of cracks in the veneer under the high pressures applied by the embossing plates or grain rolls during the densifying and embossing operations. However, the presence of coarse granular material at the veneer surface of the finished shingle or siding sheet imparts to said surface a comparatively rough and coarse texture and undesirable non-uniformity of color, since the color of such coarse granular material is not uniform and does not match that of the veneer. Moreover, the rough texture of a granular surface increases the susceptibility of such surface to collection of dust and soil and to undesirable staining and rapid deterioration of color on exposure to moisture or weather.

A principal object of the present invention is to provide a method of developing a tough decorative veneer coating of smooth texture for a structural fibro-cementitious sheet while avoiding difficulties with formation of surface blisters or cracks in the veneer during high pressure densifying and embossing operations on the composite sheet product. Another object is to provide an efficient and economical method of manufacturing hard and dense veneer coated asbestos-cement sheets of improved color stability and surface texture while avoiding use of coarse granular coating and surfacing material.

With the above objects in view, the invention consists in the improved method of manufacturing hard and dense composite fibro-cementitious sheets which is hereinafter described and more particularly defined by the accompanying claims.

In the following description reference will be made to the attached drawings, in which:

Fig. 1 is a diagrammatic assembly view of apparatus adapted for manufacturing fibro-cementitious sheets in accordance with the present invention;

Fig. 2 is a face view of an embossed composite sheet of the type produced by the process; and Fig. 3 is an enlarged sectional view taken on the line 3—3 of Fig. 2.

Important features of the present invention include the steps taken to effect preliminary consolidation and uniform moistening of originally dry base layer and veneer coating layer compositions so as to produce a dense composite veneer surfaced and embossed asbestos-cement sheet having a soil resistant surface of smooth texture, while avoiding use of coarse granular parting material at the veneer surface and also avoiding difficulties with formation of surface blisters or cracks in the veneer under the high pressure densifying and embossing operations performed on the composite sheet product.

A satisfactory method of manufacturing hard and dense asbestos-cement shingles or siding units in accordance with the present invention involves the following steps:

The top surface of an endless travelling belt 10 of canvas or the like is uniformly wetted with water, which may be supplied from a box 11 by a depending apron. The amount of water fed to the belt at 11 is only sufficient to wet the surface and material immediately in contact therewith. The water is distributed in such a way as to spread it evenly across the width of the belt. The top surface of the belt should be smooth. A small amount of finely divided sand may be spread over the surface of the belt by an applicator 12. Such sand is used at this point to facilitate easy stripping of the asbestos-cement base layer from the belt beyond the initial press roll consolidation stage.

A dry base mixture including clean asbestos fibers and finely divided hydraulic cement is next distributed over the top surface of the belt in a layer 13 of sufficient thickness to yield a final product of between ⅛" and ⅜" thickness. The base mixture layer preferably includes finely divided silica. The dry mixture is deposited on the belt by means of a fluff box 14 in a layer 13 of as nearly uniform thickness as possible, and a picker roll 15 is operated to effect approximate levelling of the layer material.

Belt 10 is preferably operated to continuously advance the layer material at a speed of at least about 50 feet per minute. The layer is initially consolidated by the action of a number of perforate hollow press rolls 16, which rest on the layer material and effect removal of air therefrom by application of suction within the rolls. Further consolidation of the dry layer material is effected by passing it through the bite of a pair of press rolls 17 having smooth surfaces. After passing the press rolls 17, water is distributed over the layer material by an apron spreader 18 in amount approximately limited to that necessary to hydrate the cement in the base layer 13 and to impart to the base layer suitable plasticity for cutting under a cutter roll at a later stage of the operation.

After passing water spreader 18 the consolidated layer material 13 is carried for some distance along the upper surface of belt 10 before it is further compressed and consolidated by passing through the bite of a second set of smooth-face press rolls 19. The spacing between water spreader 18 and press rolls 19 is preferably such as to afford a period of at least 30 seconds of elapsed time between application of the water to the surface of the layer material and its further consolidation under the press rolls 19, for thorough absorption and penetration of the water throughout the full thickness of the layer 13.

After passing press rolls 19 the consolidated layer material is transferred from belt 10 to a second short conveyor belt 20, which carries the layer material under a cutter roll 21. Cutter 21 divides the layer material into sheet segments or panels 22 which are of slightly larger area than the finished shingles or siding units into which the segments 22 are finally trimmed. After passing the cutter 21 and while still supported by the belt 20, the segments 22 advance beneath a vibrating screen feeder 23. Screen 23 is operated to distribute evenly over the top surfaces of the moistened base layer segments 22 a dry veneer coating mixture layer 24 comprising very short asbestos fibers or fiberized magnesium silicate, finely divided mineral pigment, and finely divided white Portland cement. The veneer mixture also preferably includes finely divided silica. The veneer is applied in a thoroughly mixed substantially dry state in an amount calculated to develop a thin veneer coating for the shingles, such coating to have a thickness of .015"–.022". Following the spreading of the dry coating layer 24 over the base layer 13, conveyor 20 advances the veneer-coated segments 22 beneath a perforate hollow roll 25 which operates to liberate air from the dry veneer coating and to uniformly spread and consolidate the layer material.

After passing the perforate roll 25, the composite segments 22 are transferred from the surface of conveyor 20 to the surface of a third conveyor belt 26. Belt 26 is operated at a somewhat increased rate of speed as compared with the speeds of belts 10 and 20, in order to take care of increases in the areas of the segments 22 which result from their consolidation to final dimensions under the pressures imposed thereon by the high pressure densifying and embossing operations. Conveyor 26 advances each segment 22 in turn through the bite of a pair of press rolls 27 which operate to substantially densify the dry veneer layer 24 and to develop an initial bond between the veneer layer and the moist base layer of each segment.

On its discharge from the press rolls 27, each segment 22 passes beneath a water spreader 28, which delivers to the consolidated veneer surface sufficient water to effect hydration of the cement component of the veneer layer. Conveyor 26 then delivers the moistened veneer coated segments 22 to a set of hydraulically actuated grain rolls 30, by means of which the consolidated segments are placed under pressures of the order of 5000–10,000 lbs. per square inch to effect final densification of the segments to suitable shingle thickness. The distance separating water spreader 28 from the bite of grain rolls 30 is preferably such as to afford a time period of at least approximately 20 seconds to secure penetration and absorption of the water applied at 28 through the full thickness of the dry veneer layer material.

The upper one of the pair of grain rolls 30 is preferably an embossing roll having on its surface a pattern of projections which operate to emboss a corresponding pattern of indentations on the veneer faces of the composite sheet segments. During the compressing and embossing operation the top grain roll 30 develops a negative of its pattern as irregularities in the face of the veneer 24 and also in the face of the base sheet 13. In other words, the embossing operation develops alternate elevations and depressions in the top surface of the base layer to match conforming irregularities on the lower surface of the veneer, as shown in Fig. 3. Thus by this embossing operation the veneer coating is keyed in with and locked to the base sheet over the complete area of the composite sheet.

The final cure of the consolidated sheets may be carried out by normal air curing methods. Such air curing is initiated after the segments have passed the bite of the grain rolls 30 and have been accepted by a takeoff conveyor 31. In the event that the sheet segments incorporate in their structure a substantial proportion of finely divided silica as well as Portland cement, the final cure is preferably effected by confining the segments 22 in a closed autoclave in the presence of saturated steam at pressures of 75–150 lbs. per square inch. Complete cure may be effected under these steam-curing conditions in periods of less than 24-hour length. The curing operation develops a strongly bonded composite sheet in which the veneer adheres strongly to the base 13.

When the sheet segments do not incorporate silica in their composition, they are preferably cured by prolonged exposure to moist air at substantially normal temperature. Even though the segments 22 are finally subjected to a steam cure, they are preferably given an initial air cure to develop a preliminary air set before being trimmed to precise dimensions. Thus the segments leaving the bite of the grain rolls 30 are allowed to stand at normal atmospheric temperature for a period of two to five days, after which they are trimmed and punched to final dimensions and form. This trimming and punching is carried out at this stage prior to the final heat-hardening stage, without encountering substantial difficulties with cracking or chipping of the veneer layer or with separation of the veneer from the base.

The composition of the base layer 13 may include Portland cement and asbestos fibers in approximately the proportions normally used in the manufacture of asbestos and cement shingles, say 60–120 parts asbestos fibers to 100 parts of the cement. The base sheet composition may also include 30–70 parts of finely divided silica to 100 parts of cement. A suitable size classification of asbestos fibers for the base layer 13 is aproximately 50% retained on a 10 mesh screen and 50% through a 10 mesh screen by the standard Quebec wet screen test.

The proportion of short asbestos fibers in the veneer coating preferably lies in the range 10–20% of the dry weight of the veneer. The fibers in the veneer coating are preferably much shorter than those in the base. Such fibers may classify at least 90% through a 10 mesh screen. A preferred dry veneer formula for a white shingle includes approximately 10% by weight of highly refined and short asbestos fibers, 20% white Portland cement, 25% white silica flour, 17% hydrated lime, 25% finely divided white fibrous magnesium silicate (Asbestine), and 2–5% titanium oxide. The cement, silica, lime and pigment should all have particle sizes finer than 200 mesh. For colored shingles, pigments such as chrome oxide or iron oxide may be substituted in the above formula for titanium oxide.

Maximum production of shingles or sheets of satisfactory durability is obtained when the relative weight of the veneer represents a definite small fraction of the total weight of the shingle. In other words, the most durable shingle is one with a thin veneer coating (approximately .025–.05 inch thick for shingles of ⅛–⅜ inch thickness and 350 square inches surface area).

The embossing operation is best practiced when employing a grain roll which applies full pressure evenly over the width of the shingle segment and on which the projections forming the pattern are of rounded rather than sharp contour and are so dimensioned as to develop indentations in the sheet surfaces of not to exceed .020"–.025" depth. In embossing indentation patterns having a maximum depth in the indicated range, it has been found that segments 22 having veneer coatings which have been strongly compressed and lightly moistened throughout before reaching the grain roll, can be suitably densified and embossed under the high pressure of the grain roll without sticking to the grain roll. Application of fairly high pressure to the dry veneer under rolls 27 actually facilitates penetration of moisture applied by spreader 28 through the veneer, and thereby insures suitable grain roll densification without developing cracks in the veneer or blisters at the veneer surface. The press rolls 27 which consolidate the dry veneer layer just prior to its being wetted by spreader 28, should be operated to apply pressures as high as 700–800 lbs. or more per inch of width to the sheet segments, in order to promote substantial uniform penetration of water from the underlying base layer and from the spreader 28 into the dry veneer.

The amount of water applied to the base layer by spreader 18, and to the veneer by spreader 28, is limited to that necessary to satisfy the cement in the composite shingle, without providing any substantial excess. If too much water is added at either of points 18 or 28, difficulty is encountered with sticking respectively at the press rolls 19 and at the grain rolls 30. If not enough water is added at either of these points, a weak cementitious bond is developed and poor adherence is secured between the veneer coating and the base layer. The water spreaders 18 and 28 should be spaced respectively as far in advance of the press rolls 19 and grain rolls 30 as is practicable with a continuous equipment layout of the type pictured in Fig. 1, in order to allow adequate time for the water to penetrate by absorption throughout the layers of dry material before such layers are subjected to the high compression of the press and grain rolls.

Since many variations may be made from the illustrative details given, without departing from the scope of the invention, it is intended that the invention should be limited only by the terms of the claims interpreted as broadly as consistent with novelty over the prior art.

What we claim is:

1. In manufacturing asbestos-cement shingles the steps comprising, forming a base layer including a dry mixture of asbestos fibers and hydraulic cement, deaerating and compressing the layer material, moistening the material with sufficient water to hydrate the cement, continuously advancing the layer while allowing the water to penetrate uniformly therethrough, applying to said moistened base layer a veneer coating including an intimate dry mixture of short asbestos fibers, finely divided mineral pigment and finely divided hydraulic cement, deaerating and strongly compressing said veneer coating and moistening the same while advancing the veneer coated sheet at a rate of at least 50 ft. per minute and allowing a period of at least 20 seconds for the moisture to penetrate throughout the veneer coating, highly compressing the composite shingle, and developing a hardening set of the cement binder.

2. The method of manufacturing a composite dense and hard structural sheet which comprises, forming a base layer including an intimate dry mixture of asbestos fibers, finely divided silica and Portland cement, compressing the base layer material and wetting it with sufficient water to hydrate the cement, continuously advancing said base layer material while allowing a period of at least 30 seconds for moisture penetration therethrough, further consolidating the moist base layer material, distributing over the face of said moist base layer a veneer coating including an intimate dry mixture of particles most of which are finer than 200 mesh comprising silica, Portland cement, mineral pigment and fibrous magnesium silicate, strongly compressing the dry veneer coating and moistening it with sufficient water to hydrate the cement component thereof, advancing the veneer coated sheet while allowing a period of at least 20 seconds for the moisture to penetrate throughout the coating layer, highly compressing the composite sheet while forming a pattern of impressions in the veneer coating which extends into the base layer, and curing the densified sheet by heating it in an atmosphere of saturated steam under superatmospheric pressure.

3. The method of manufacturing hard and dense veneer coated shingles while inhibiting development of surface blisters and cracks in the veneer which comprises, uniformly distributing over the moist face of a compressible uncured fiber-cement base sheet a thin coating layer comprising a dry mixture of finely divided mineral pigment and finely divided hydraulic cement, moistening said coating layer with sufficient water to hydrate the cement, allowing a period of at least 20 seconds for the moisture to penetrate throughout the coating layer material, highly compressing the composite sheet thus formed, and curing the composite sheet to develop a hardening set of the cement binder.

4. In manufacturing a hard and dense shingle the steps comprising, forming a base sheet of moist compressible fiber-cement composition, distributing on said sheet a veneer coating including a dry mixture of finely divided mineral pigment, fibers and finely divided hydraulic cement, strongly compressing said veneer material and moistening it with sufficient water to hydrate the cement component thereof, continuously advancing the veneer coated green sheet while allowing a period of at least 20 seconds for the moisture to penetrate throughout the veneer coating, subjecting the moist compressible composite sheet to compression of the order of at least 5000 lbs. per square inch and simultaneously impressing on the surface of the sheet a pattern of indentations which extend into the base sheet, and finally trimming the sheet and curing it to develop a hardening set.

5. The method of manufacturing a composite dense and hard structural sheet which comprises, forming a base layer including an intimate, dry mixture of asbestos fibers, finely divided silica and Portland cement, uniformly wetting the base layer with sufficient water to hydrate the cement, applying to a face of said layer a veneer coating including a dry mixture of finely divided silica, fibrous magnesium silicate, mineral pigment and hydraulic cement, compressing the veneer coated composite sheet and moistening the veneer coating with sufficient water to hydrate the cement, allowing a period of at least 20 seconds for the water to penetrate throughout the veneer coating, compressing said composite sheet and embossing the veneer surface, and developing a hardening set of the cement binder.

HAROLD J. OTIS.
JACK HESSE.

REFERENCES CITED

The following references are of record in the file of this patent:

UNITED STATES PATENTS

| Number | Name | Date |
|---|---|---|
| 1,453,382 | D'Alessandro et al. | May 1, 1923 |
| 1,641,874 | Wert | Sept. 6, 1927 |
| 1,945,003 | Smolak et al. | Jan. 30, 1934 |
| 2,010,425 | Buczkowski | Aug. 6, 1935 |
| 2,230,880 | Brown | Feb. 4, 1941 |
| 2,401,663 | Rembert | June 4, 1946 |